United States Patent
Hwang et al.

(10) Patent No.: US 10,404,077 B2
(45) Date of Patent: Sep. 3, 2019

(54) METHOD AND APPARATUS FOR BALANCING BATTERY

(71) Applicant: SAMSUNG ELECTRONICS CO., LTD., Suwon-si (KR)

(72) Inventors: Hyosun Hwang, Seoul (KR); YoungJae Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/642,644

(22) Filed: Jul. 6, 2017

(65) Prior Publication Data
US 2018/0152026 A1   May 31, 2018

(30) Foreign Application Priority Data
Nov. 29, 2016   (KR) .................. 10-2016-0159911

(51) Int. Cl.
*H02J 7/00* (2006.01)
*B60L 50/50* (2019.01)
*B60L 58/22* (2019.01)

(52) U.S. Cl.
CPC ............ *H02J 7/0014* (2013.01); *B60L 50/50* (2019.02); *B60L 58/22* (2019.02); *H02J 7/0016* (2013.01); *H02J 7/0021* (2013.01); *Y02T 10/7055* (2013.01)

(58) Field of Classification Search
CPC ...... H02J 7/0014; H02J 7/0021; H02J 7/0022; H02J 7/34; H01M 2010/4271; H01M 10/4207; H01M 10/441; H01M 10/44

USPC ................ 320/103–104, 111–112, 119–122, 320/128–136, 150, 155, 159–160
See application file for complete search history.

(56) References Cited

U.S. PATENT DOCUMENTS

| | | | |
|---|---|---|---|
| 7,973,534 B2 * | 7/2011 | Tatebayashi | H02J 7/0026 320/116 |
| 8,975,874 B2 | 3/2015 | Berkowitz et al. | |
| 8,994,337 B2 * | 3/2015 | Kim | H02J 7/0016 320/122 |
| 9,157,968 B1 | 10/2015 | Taylor et al. | |
| 2003/0222619 A1 * | 12/2003 | Formenti | H02J 7/0014 320/119 |
| 2014/0159671 A1 * | 6/2014 | Kawahara | B60L 3/0046 320/134 |
| 2016/0105039 A1 | 4/2016 | Jeon et al. | |
| 2016/0118830 A1 | 4/2016 | Jeon et al. | |

FOREIGN PATENT DOCUMENTS

| | | |
|---|---|---|
| JP | 08-254573 A | 10/1996 |
| JP | 2014-068467 A | 4/2014 |
| JP | 5621818 B2 | 11/2014 |
| KR | 10-0845960 B1 | 7/2008 |
| KR | 10-2010-0085791 A | 7/2010 |
| KR | 10-2012-0065293 A | 6/2012 |
| KR | 10-1497602 B1 | 3/2015 |
| KR | 10-1500547 B1 | 3/2015 |
| KR | 10-2017-0058124 A | 5/2017 |

* cited by examiner

*Primary Examiner* — Nghia M Doan
(74) *Attorney, Agent, or Firm* — NSIP Law

(57) ABSTRACT

Provided is a battery balancing apparatus and method including determining state information of a battery unit based on battery quantity data of the battery unit, determining a balancing parameter of the battery unit based on a range comprising the state information, and controlling a balancing unit based on the balancing parameter.

20 Claims, 11 Drawing Sheets

FIG. 3

| | | | | | | | | | | | | |
|---|---|---|---|---|---|---|---|---|---|---|---|---|
| + | | | | | | | | | | | | |
| + | | | | O | | | | | | | | O |
| 0 | O | | O | O | | O | O | O | | O | O | O |
| - | | O | | | | | | O | | | | |
| - | | | | | | | | | | | | |

| | | | | | | | | | | | | |
|---|---|---|---|---|---|---|---|---|---|---|---|---|
| + | | O | O | O | | | | O | O | O | O | O |
| + | O | | | | O | O | O | | | | | O |
| 0 | | | | | | | | | | | | |
| - | | | | | | | | | | | | |
| - | | | | | | | | | | | | |

| | | | | | | | | | | | | |
|---|---|---|---|---|---|---|---|---|---|---|---|---|
| + | | O | | | | | O | | | | | |
| + | | | | | | | | | O | | | O |
| 0 | O | | O | | | O | O | | | O | | O |
| - | | | O | | | | | | | | | |
| - | | | | O | | | | | | O | | |

METHOD AND APPARATUS FOR BALANCING BATTERY

CROSS-REFERENCE TO RELATED APPLICATIONS

This application claims the benefit under 35 USC § 119(a) of Korean Patent Application No. 10-2016-0159911 filed on Nov. 29, 2016 in the Korean Intellectual Property Office, the entire disclosure of which is incorporated herein by reference for all purposes.

BACKGROUND

1. Field

The following description relates to a method and apparatus for battery balancing.

2. Description of Related Art

When cells in a battery are repeatedly charged and discharged, differences, such as, chemical difference, aging difference, may occur between the cells. Due to these differences, a voltage deviation or a capacity deviation may occur between the cells. Accordingly, overcharging or over-discharging may occur in particular cell(s), which may result in decreasing a capacity of the battery. Due to a degradation of the battery, a battery life may be reduced.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a battery balancing method including determining state information of a battery unit based on battery quantity data of the battery unit, determining a balancing parameter of the battery unit based on a range including the state information, and controlling a balancing unit based on the balancing parameter, wherein the balancing parameter may include any one or any combination of operational information indicating an operational state of the balancing unit and a balancing period.

The determining of the balancing parameter may include the defining of the operational state of the balancing unit to being OFF.

The determining of the balancing parameter may include determining the balancing period based on an update period of the state information.

The determining of the balancing parameter may include determining the balancing period based on an update period of the state information, defining an output value corresponding to a battery quantity based on deviation information associated with the state information, in response to balancing being performed, and determining whether to apply a weight to the output value based on deviation information associated with a previous state information of the battery unit.

The determining of whether to apply the weight may include not applying the weight to the output value, in response to the battery unit being determined as a normal type based on a distribution of deviation information associated with each of a plurality of previous state information of the battery unit, and applying the weight to the output value, in response to the battery unit being determined as an abnormal type based on the distribution of the deviation information.

The abnormal type may include a first type corresponding to the deviation information being distributed in an area greater than a reference value, a second type corresponding to the deviation information being distributed in an area less than the reference value, a third type corresponding to a difference value between adjacent deviation information being greater than a threshold, and the applying of the weight may include defining a value less than a reference value as the weight in response to the battery unit being determined as the first type or the third type, and defining a value greater than the reference value as the weight in response to the battery unit being determined as the second type.

The determining of the balancing parameter may include the operational information being configured to turn the balancing unit OFF, in response to the state information being included in a first range, determining a period value corresponding to a second range as the balancing period in response to the state information being included in the second range, determining a period value corresponding to a third range as the balancing period in response to the state information being included in the third range, and the period value corresponding to the third range being lesser than the period value corresponding to the second range.

The period value corresponding to the second range may include a product of an integer and an update period of the state information, and the period value corresponding to the third range may include a product of another integer less than the integer and the update period.

The determining of the balancing parameter may include the operational information being configured to turn the balancing unit OFF, in response to the state information being included in a first range, defining an output value corresponding to a battery quantity to be output while the battery unit performs balancing in response to the state information being included in a second range, outputting the output value in response to the state information being included in a third range, and applying a weight to the output value.

The applying of the weight may include defining a value less than a threshold as the weight in response to deviation information associated with each of a plurality of previous state information of the battery unit being distributed in an area greater than a reference value, defining a value greater than the threshold as the weight in response to the deviation information being distributed in an area less than the reference value, and defining a value less than the threshold as the weight in response to a difference value between adjacent deviation information being greater than a reference.

In another general aspect, there is provided a battery balancing apparatus including a processor is configured to determine state information of a battery unit based on battery quantity data of the battery unit, to determine a balancing parameter of the battery unit based on a range that includes the state information, and to control a balancing unit based on the balancing parameter, wherein the balancing parameter may include any one or any combination of operational information indicating an operational state of the balancing unit and a balancing period.

The processor may be configured to define the operational state of the balancing unit being OFF.

The processor may be configured to determine the balancing period based on an update period of the state information.

The processor may be configured to determine the balancing period based on an update period of the state information, to define an output value corresponding to a battery quantity based on deviation information associated with the state information, in response to balancing being performed, and to determine whether to apply a weight to the output value based on deviation information associated with a previous state information of the battery unit.

The processor may be configured to not apply the weight to the output value in response to the battery unit being determined as a normal type based on a distribution of deviation information associated with each of a plurality of previous state information of the battery unit, and to apply the weight to the output value in response to the battery unit being determined as an abnormal type based on the distribution of the deviation information.

The abnormal type may include a first type corresponding to the deviation information being distributed in an area greater than a reference value, a second type corresponding to the deviation information being distributed in an area less than the reference value, a third type corresponding to a difference value between adjacent deviation information is greater than a predetermined reference, and the processor may be configured to define a value less than a reference value as the weight in response to the battery unit being determined as the first type or the third type, and to define a value greater than the reference value as the weight in response to the battery unit being determined as the second type.

The processor may be configured to define the operational information to turn the balancing unit OFF, in response to the state information being included in a first range, to determine a period value corresponding to a second range as the balancing period in response to the state information being included in the second range, to determine a period value corresponding to a third range as the balancing period in response to the state information being included in the third range, and the period value corresponding to the third range being lesser than the period value corresponding to the second range.

The period value corresponding to the second range may include a product of an integer and an update period of the state information, and the period value corresponding to the third range may include a product of another integer less than the integer and the update period.

The processor may be configured to define the operational information to turn the balancing unit OFF, in response to the state information being included in a first range, to define an output value corresponding to a battery quantity to be output while the battery unit performs balancing in response to the state information being included in a second range, to output the output value in response to the state information being included in a third range, and to apply a weight to the output value.

The processor may be configured to define a value less than a threshold as the weight in response to deviation information associated with each of a plurality of previous state information of the battery unit being distributed in an area greater than a reference value, to define a value greater than the threshold as the weight in response to the deviation information being distributed in an area less than the reference value, and to define a value less than the threshold as the weight in response to a difference value between adjacent deviation information being greater than a reference.

Other features and aspects will be apparent from the following detailed description, the drawings, and the claims.

BRIEF DESCRIPTION OF THE DRAWINGS

FIG. 3 illustrates an example of describing a weight control process.

Figure 1A:
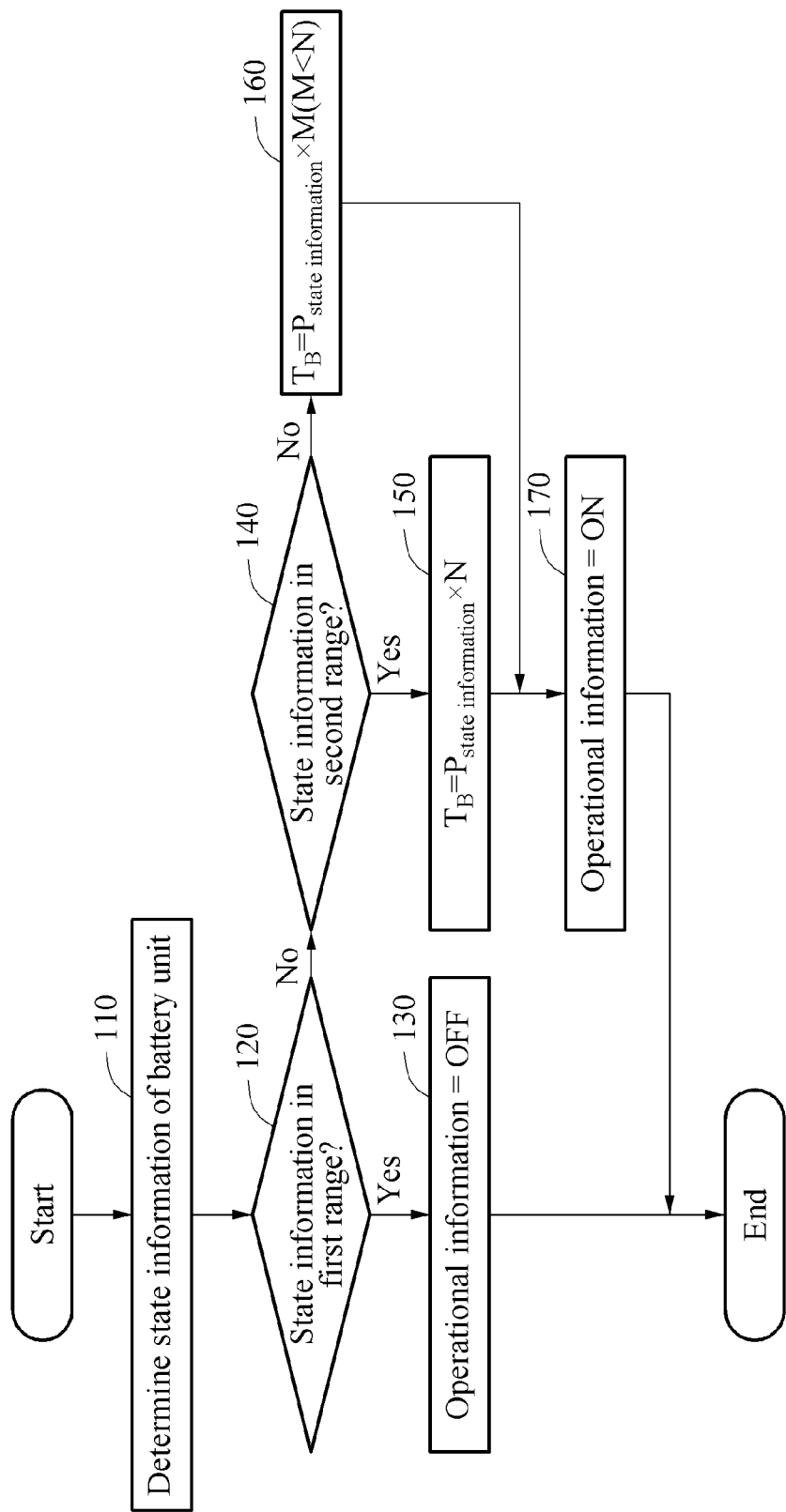
FIG. 1A is a diagram illustrating an example of a battery balancing method.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after gaining a thorough understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of functions and constructions that are known in the art may be omitted for increased clarity and conciseness.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

The following structural or functional descriptions are exemplary to merely describe the examples, and the scope of the examples is not limited to the descriptions provided in the present specification. Various changes and modifications can be made after gaining a understanding of the disclosure of this application.

Although terms of "first" or "second" are used to explain various components, the components are not limited to the terms. These terms should be used only to distinguish one component from another component. For example, a "first" component may be referred to as a "second" component, or similarly, and the "second" component may be referred to as the "first" component within the scope of the right according to the concept of the present disclosure.

It will be understood that when a component is referred to as being "connected to" another component, the component can be directly connected or coupled to the other component or intervening components may be present.

Figure 1B:
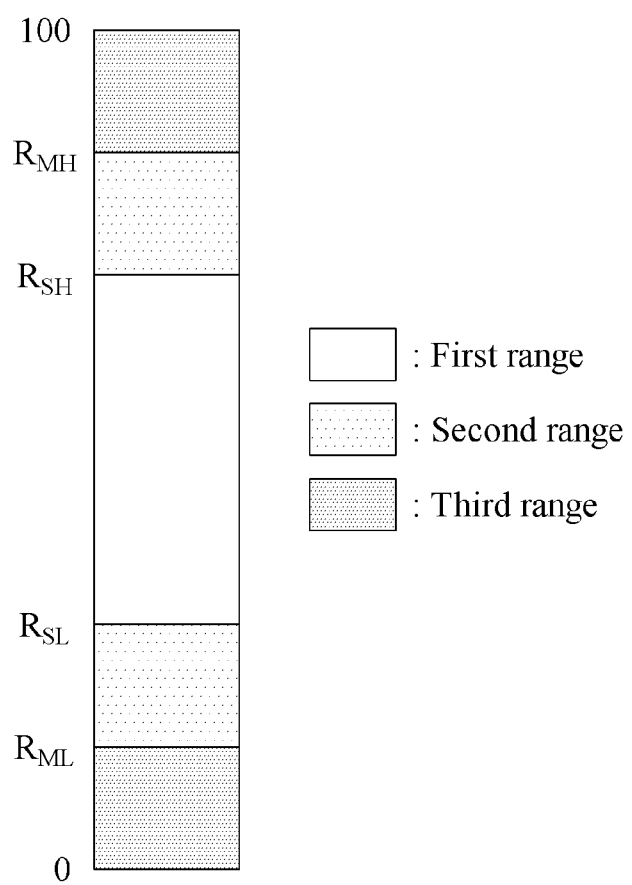
FIG. 1B illustrates an example of describing a battery balancing method.

As used herein, the singular forms are intended to include the plural forms as well, unless the context clearly indicates otherwise. FIG. 1A is a diagram illustrating an example of a battery balancing method, and FIG. 1B illustrates an example of describing a battery balancing method.

In an example, the battery balancing method of FIG. 1A is performed by a battery balancing apparatus.

Referring to FIG. 1A, in 110, the battery balancing apparatus determines state information of a battery unit. In an example, the battery balancing apparatus collects battery quantity data of the battery unit and determines the state information based on the battery quantity data. The battery unit is any battery, such as, for example, a battery cell, a battery module, or a battery pack. In an example, the battery quantity data includes data related to the battery such as, for example, voltage data, current data, temperature data, and impedance data. The state information may include, for example, a charging state such as state of charge (SOC), a battery life state such as state of health (SOH). The state information may be an SOC value to which SOH is applied.

In an example, the battery balancing apparatus may determine state information of a battery pack based on battery quantity data of battery cells or battery modules.

The state information may be included in one of a first range, a second range, and a third range. The first range denotes a range greater than or equal to $R_{SL}$ and less than or equal to $R_{SH}$. The second range denotes a range greater than or equal $R_{ML}$ and less than $R_{SL}$ and/or a range greater than $R_{SH}$ and less than or equal to $R_{MH}$. The third range denotes a remaining range.

FIG. 1B illustrates an example of the first range, the second range, and the third range.

At least one value of $R_{ML}$, $R_{SL}$, $R_{SH}$, and $R_{MH}$ may vary based on an operational mode of a system that includes the battery balancing apparatus.

In 120, the battery balancing apparatus determines whether the state information is included in the first range. If the state information is included in the first range, in 130, the battery balancing apparatus defines operational information of a balancing parameter as being OFF. The operational information indicates information for determining whether to operate the balancing unit. In one example, the balancing unit corresponding to a balancing processor, a balancing circuit, a balancing integrated chip (IC), or a differential charge handler (DCH) described in FIG. 7. If $R_{SL} \leq$ state information$\leq R_{SH}$, the battery balancing apparatus may determine to not operate the balancing unit and may define the operational information as being OFF. In an example, if the operational information is defined as OFF, power is not to be supplied to the balancing unit. Thus, power consumption is reduced.

If the state information is not included in the first range, in 140, the battery balancing apparatus determines whether the state information is included in the second range. If the state information is included in the second range, the battery balancing apparatus determines a balancing period $T_B$ among balancing parameters. For example, if the state information is included in the second range, in 150, the battery balancing apparatus defines $P_{state\ information} \times N$ as the balancing period $T_B$, i.e., $T_B = P_{state\ information} \times N$. $P_{state\ information}$ denotes an update period of the state information. In an example, $P_{state\ information}$ denotes an SOC calculation period, for example, 100 milliseconds (ms). N denotes an integer greater than 0. If the state information is included in the second range, in 170, the battery balancing apparatus defines the operational information as being ON. In an example, if $R_{ML}$ state information$<R_{SL}$ or if $R_{SH}<$state information$\leq R_{MH}$, the battery balancing apparatus may determine to operate the balancing unit and may define the operational information as being ON. The battery balancing apparatus may determine the balancing period based on $T_B = P_{state\ information} \times N$.

If $P_{state\ information}$ is not included in the second range, in 160, the battery balancing apparatus may define $P_{state\ information} \times M$ as the balancing period $T_B$. M denotes an integer greater than 0 and is less than N, i.e., 0<M<N. If the state information is not included in the second range, in 170, the battery balancing apparatus defines the operational information as ON. In an example, if 0<state information<$R_{ML}$ or if $R_{MH}<$state information$\leq 100$, the battery balancing apparatus determines to operate the balancing unit, defines the operational information as being ON, and determines the balancing period based on $T_B = P_{state\ information} \times M$. Since M<N, a balancing period where the state information is included in the third range is less than a balancing period where the state information is included in the second range. Accordingly, balancing may be performed relatively frequently on a battery unit where state information is included in the third range compared to a battery unit where state information is included in the second range. In an example, balancing is performed on the plurality of battery units at different points in time, respectively. In an example in which state information of a first battery unit is included in the second range and state information of a second battery unit is included in the third range, a balancing period of the second battery unit is determined to be less than a balancing period of the first battery unit. Accordingly, balancing of the second battery unit may be performed prior to performing balancing on the first battery unit.

In an example, if the state information is included in the third range, the battery balancing apparatus performs a weight control. The weight control may be performed before the balancing period is determined. Also, the weight control and determining of the balancing period may be performed simultaneously or in parallel. A weight may be adjusted through the weight control. The weight control is described with reference to FIG. 2.

In an example, a balancing parameter that includes operational information and/or the balancing period is determined based on a range that includes the state information. In the above example, if the state information is included in the first range, the operational information is defined as OFF. If the state information is included in the second range, the operational information is defined as ON and the balancing period $T_B$ may be defined as $P_{state\ information} \times N$. If the state information is included in the third range, the operational information is defined as ON and the balancing period $T_B$ may be defined as $P_{state\ information} \times M$.

The battery balancing apparatus may control the balancing unit based on the balancing parameter. In an example, the battery balancing apparatus generates a control signal based on the balancing parameter, and transmits the control signal to a balancing circuit. In an example, the balancing circuit operates based on the control signal. For example, if the operational information is defined as OFF, the balancing circuit may not operate and the power may not be supplied to the balancing circuit, for example, a switching element within the balancing circuit. If the operational information is defined as ON and the balancing period $T_B$ is defined as $P_{state\ information} \times N$, the balancing unit may perform balancing based on the balancing period $T_B$. Balancing may be performed for each battery unit. State information between a plurality of battery units may become mutually equivalent.

Figure 2:
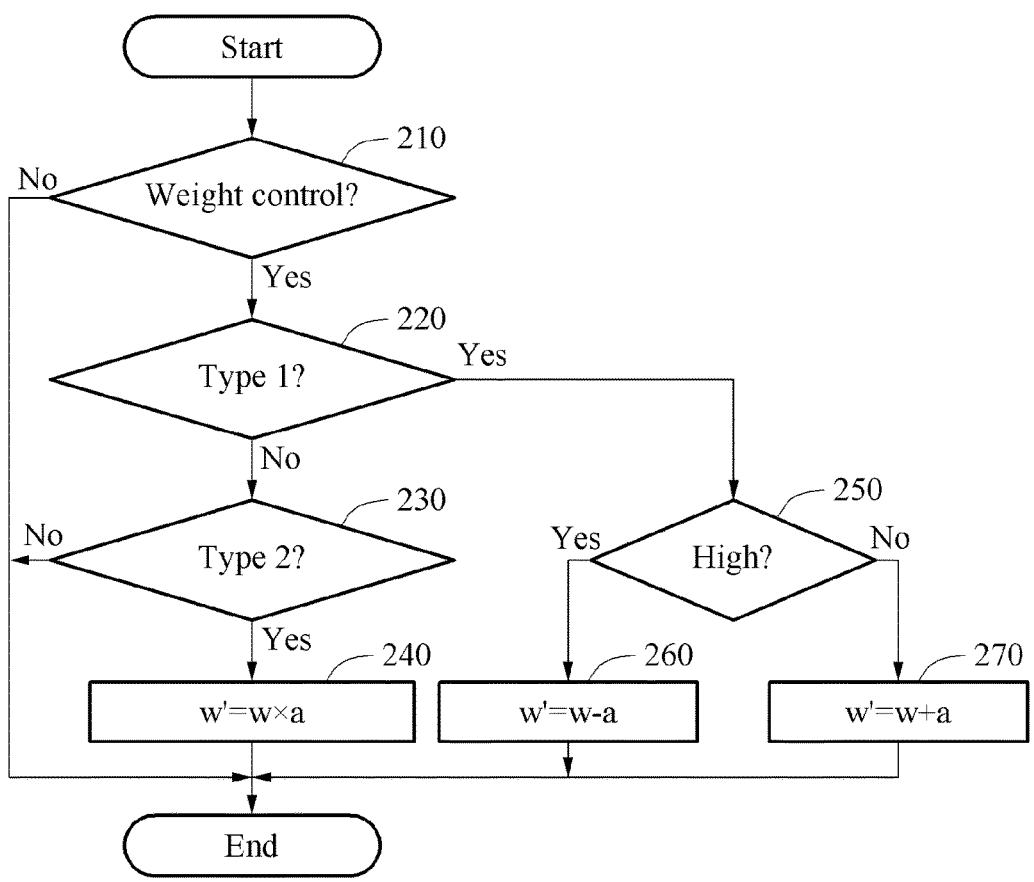
FIG. 2 is a diagram illustrating an example of a weight control process.

FIG. 2 is a diagram illustrating an example of describing a weight control process. The operations in FIG. 2 may be performed in the sequence and manner as shown, although the order of some operations may be changed or some of the operations omitted without departing from the spirit and scope of the illustrative examples described. Many of the operations shown in FIG. 2 may be performed in parallel or concurrently. One or more blocks of FIG. 2, and combinations of the blocks, can be implemented by special purpose hardware-based computer that perform the specified functions, or combinations of special purpose hardware and computer instructions. In addition to the description of FIG. 2 below, the above descriptions of FIG. 1 is also applicable to FIG. 2, and are incorporated herein by reference. Thus, the above description may not be repeated here. The weight control process of FIG. 2 is performed by a battery balancing apparatus.

Referring to FIG. 2, in 210, the battery balancing apparatus determines whether to perform a weight control. For example, if state information of a battery unit is included in a third range, the battery balancing apparatus perform the weight control.

Although not illustrated in FIG. 2, the battery balancing apparatus may verify deviation information associated with previous state information of the battery unit. Every time state information is determined, the battery balancing apparatus calculates deviation information indicating a difference between the state information and average state information. In an example, the battery balancing apparatus stores the deviation information in a memory. Deviation information of each of a plurality of pieces of state information determined prior to current state information, i.e., a plurality of pieces of previous state information may be stored in the memory. The battery balancing apparatus may verify deviation information associated with each of the plurality of pieces of previous state information by referring to the memory.

In operation 220, the battery balancing apparatus determines whether the battery unit corresponds to type 1.

The battery unit may correspond to one of type normal, type 1, and type 2. Type normal denotes a type in which state information of the battery unit is controlled in a balanced state when balancing performed and weight control is not required.

Type 1 denotes a type in which state information of the battery unit is not controlled in the balanced state although balancing is performed.

Type 2 denotes a type in which state information of the battery unit reacts sensitively.

Type 1 and type 2 may represent an abnormal type.

In one example, the battery balancing apparatus determines whether the battery unit corresponds to type 1 based on a distribution of deviation information associated with previous state information of the battery unit. Hereinafter, a battery unit corresponding to each of a plurality of types will be described with reference to FIG. 3.

Each table of FIG. 3 shows a distribution of deviation information associated with each of a plurality of pieces of previous state information of a battery unit. Referring to the tables of FIG. 3, $\Delta\Delta$ indicates great deviation information and $\Delta$ indicates intermediate deviation information. For example, $+\Delta\Delta$ may correspond to a case in which x<deviation information, and $+\Delta$ may correspond to a case in which 0<deviation information≤x. Also, $-\Delta\Delta$ may correspond to a case in which deviation information<-x, and $-\Delta$ may correspond to a case in which $-x \leq$ deviation information<0. Here, x denotes a number.

A first table of FIG. 3 shows a distribution of deviation information of a first battery unit. The first battery unit may correspond to type normal. Subsequent deviation information of deviation information corresponding to $-\Delta$ corresponds to 0. Also, subsequent deviation information of deviation information corresponding to $+\Delta$ corresponds to 0. Subsequent deviation information of deviation information not corresponding to a reference value may correspond to the reference value through balancing. Accordingly, once balancing is performed on the first battery unit, state information of the first battery unit may be controlled to be in a balanced state. Accordingly, the first battery unit may correspond to type normal.

A second table shows a distribution of deviation information of a second battery unit. The second battery unit may correspond to type 1. Subsequent deviation information of deviation information corresponding to $+\Delta\Delta$ corresponds to $+\Delta\Delta$ or $+\Delta$. Subsequent deviation information of deviation information corresponding to $+\Delta$ corresponds to $+\Delta$. A level of deviation information may vary from $+\Delta\Delta$ to $+\Delta$ in response to performing balancing, however, subsequent deviation information of deviation information corresponding to $+\Delta$ or $+\Delta\Delta$ does not correspond to the reference value. Although balancing is performed, state information of the second battery unit is not controlled to be in a balanced state. Accordingly, the second battery unit may correspond to type 1. The second battery unit showing a change pattern of deviation information that is not controlled to be in the balanced state may correspond to type 1. Type 1 may be classified into high and low. Deviation information of the second battery unit is distributed in an area greater than the reference value and thus, the second battery unit may correspond to high of type 1.

Although not illustrated in FIG. 2, subsequent deviation information of deviation information corresponding to $-\Delta\Delta$ may correspond to $-\Delta\Delta$ or $-\Delta$ with respect to another battery unit. Also, subsequent deviation information of deviation information corresponding to $-\Delta$ may correspond to $-\Delta$. In this case, although balancing is performed, subsequent deviation information does not correspond to the reference value and state information of the other battery unit is not controlled to be in a balanced state. The other battery unit may correspond to type 1. Here, deviation information of the other battery unit is distributed in an area less than the reference value and the other battery unit may correspond to low of type 1.

A third table shows a distribution of deviation information of a third battery unit. The third battery unit may correspond to type 2. The third battery unit has deviation information corresponding to $-\Delta\Delta$ and deviation information corresponding to $+\Delta\Delta$. Compared to the first battery unit and the second battery unit, a variation of deviation information of the third battery unit is greater. Subsequent deviation information of deviation information corresponding to the reference value may correspond to $+\Delta\Delta$. A difference value between adjacent deviation information may be greater than a reference, for example, $\Delta$. In the case of the third battery unit, once balancing is performed, state information may respond with sensitivity. Accordingly, the third battery unit may correspond to type 2.

Referring to FIG. 2, the battery balancing apparatus determines whether the battery unit corresponds to type 1 based on the distribution of deviation information of each of the plurality of pieces of previous state information of the battery unit. The battery balancing apparatus may analyze the distribution and may determine that the state information is not controlled to be in the balanced state. In this case, the battery unit may correspond to type 1. If the battery unit corresponds to type 1, the battery balancing apparatus determines whether the battery unit corresponds to high in operation 250. As described above, if the deviation information is distributed in an area higher than the reference value, the battery unit may correspond to high of type 1. If the deviation information is distributed in an area lesser than the reference value, the battery unit may correspond to low of type 1.

If the battery unit corresponds to high of type 1, in 260, the battery balancing apparatus defines a weight based on $w'=w-\alpha$, where, w denotes an initial weight. For example, w may be 1. The battery balancing apparatus may apply w', to an output value, which is a result of subtracting a from the initial weight w. The output value corresponds to a battery quantity output from the battery unit during balancing, which is performed under the control of a converter. The output value is described with reference to FIG. 7. If the battery unit corresponds to high of type 1, the battery balancing apparatus may adjust a weight and may apply the adjusted weight to the output value.

If the battery unit does not correspond to high of type 1, 270, the battery balancing apparatus defines the weight based on $w'=w+\alpha$ in. The battery balancing apparatus may apply w' to the output value.

If the battery unit does not correspond to type 1, in 230, the battery balancing apparatus determines that the battery unit corresponds to type 2. If a sensitivity of state information is determined to be great based on the distribution, the battery balancing apparatus may determine that the battery unit corresponds to type 2. If the battery unit corresponds to type 2, in 240, the battery balancing apparatus defines the weight based on $w'=w\times\alpha$. The battery balancing apparatus may apply w' to the output value.

If the battery unit does not correspond to type 2, the battery balancing apparatus does not apply a weight to the output value, i.e., if the battery unit corresponds to type normal, the battery balancing apparatus does not apply the weight to the output value.

In an example, the weight control is applied when a differential charge handler (DCH) including the converter performs balancing. It will be further described with reference to FIG. 7.

Figure 4:
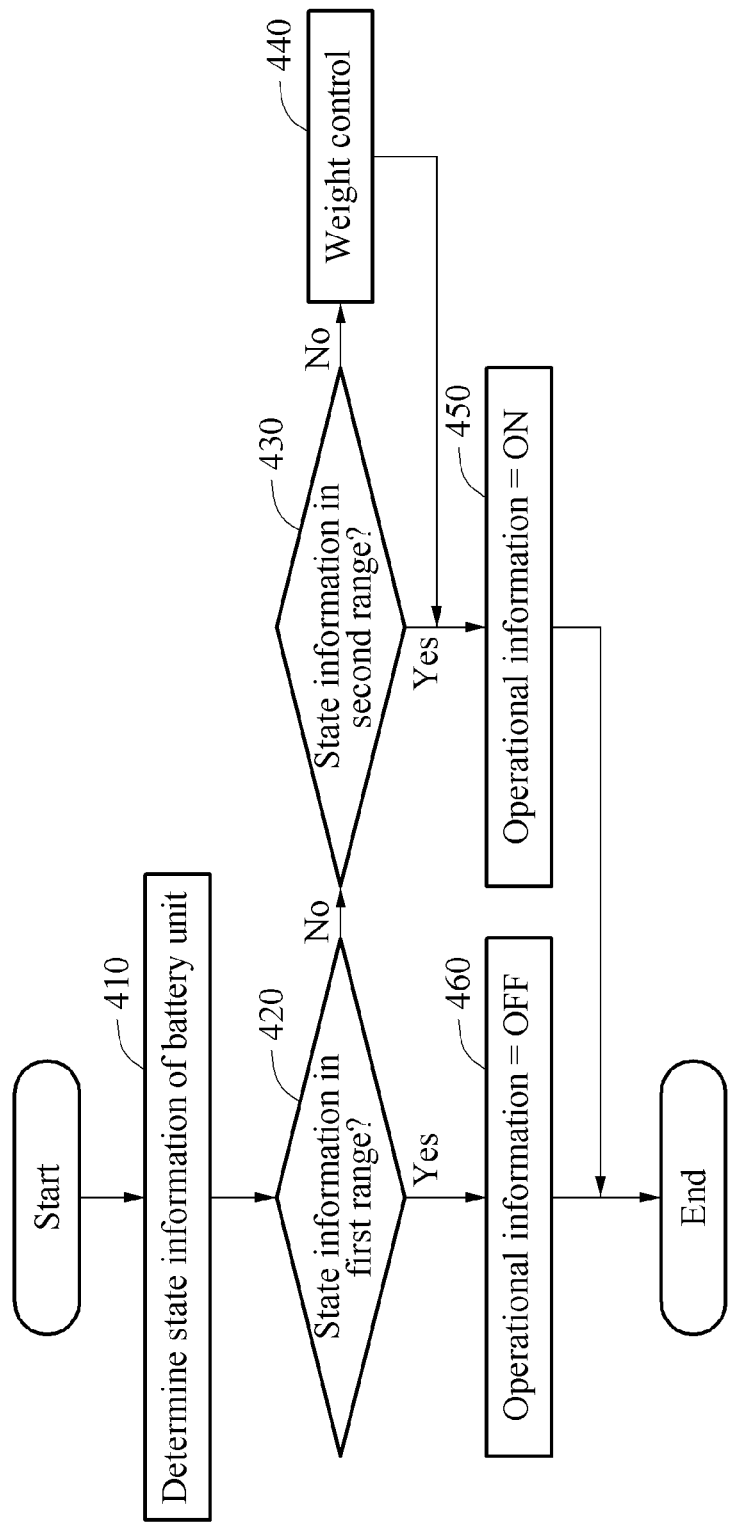
FIG. 4 is a diagram illustrating an example of a battery balancing method.

FIG. 4 is a diagram illustrating another example of a battery balancing method. The operations in FIG. 4 may be performed in the sequence and manner as shown, although the order of some operations may be changed or some of the operations omitted without departing from the spirit and scope of the illustrative examples described. Many of the operations shown in FIG. 4 may be performed in parallel or concurrently. One or more blocks of FIG. 4, and combinations of the blocks, can be implemented by special purpose hardware-based computer that perform the specified functions, or combinations of special purpose hardware and computer instructions. In addition to the description of FIG. 4 below, the above descriptions of FIGS. 1-3 are also applicable to FIG. 4, and are incorporated herein by reference. Thus, the above description may not be repeated here.

The battery balancing method of FIG. 4 may be performed by a battery balancing apparatus.

Referring to FIG. 4, in 410, the battery balancing apparatus determines state information of a battery unit.

In 420, the battery balancing apparatus determines whether the state information is included in a first range. If the state information is included in the first range, in 460, the battery balancing apparatus defines operational information as being OFF. If the state information is not included in the first range, in 430, the battery balancing apparatus determines whether the state information is included in a second range.

If the state information is included in the second range, in 450, the battery balancing apparatus defines operational information as being ON.

If the state information is not included in the first range and the second range, in 440, the battery balancing apparatus performs a weight control. In an example, the battery balancing apparatus applies a weight to an output value corresponding to a battery quantity to be output while the battery unit performs balancing, based on deviation information associated with previous state information of the battery unit.

For example, if deviation information associated with each of a plurality of pieces of previous state information of the battery unit is distributed in an area greater than the reference value, the battery balancing apparatus may define a smaller value as the weight, i.e., if the battery unit corresponds to high of type 1, the battery balancing apparatus may define the weight based on $w'=w-\alpha$.

In an example, if the deviation information is distributed in an area less than the reference value, the battery balancing apparatus may define a greater value as the weight, i.e., if the battery unit corresponds to low of type 1, the battery balancing apparatus may define the weight based on $w'=w+\alpha$.

If a difference value between adjacent deviation information is greater than a threshold, the battery balancing apparatus may define a value less than the reference value as the weight, i.e., if the battery unit corresponds to type 2, the battery balancing apparatus may define the weight based on $w'=w\times\alpha$.

The battery balancing apparatus may control the balancing unit based on a balancing parameter that includes the weight and the operational information.

The example of FIG. 4 may be applicable when the balancing unit includes a DCH. Balancing using the DCH will be described with reference to FIG. 7.

The above descriptions of FIGS. 1A through 3 are also applicable to FIG. 4, and are incorporated herein by reference. Thus, the above description may not be repeated here.

Figure 5:
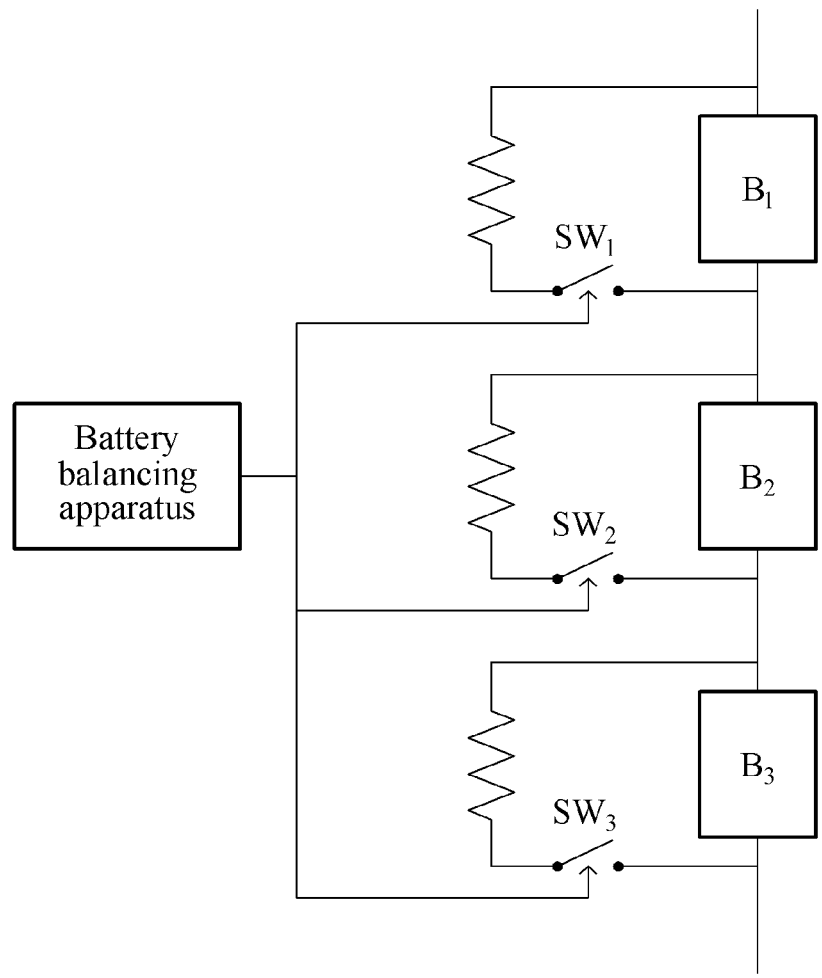
FIGS. 5 through 7 illustrate examples of describing balancing.
Figure 6:
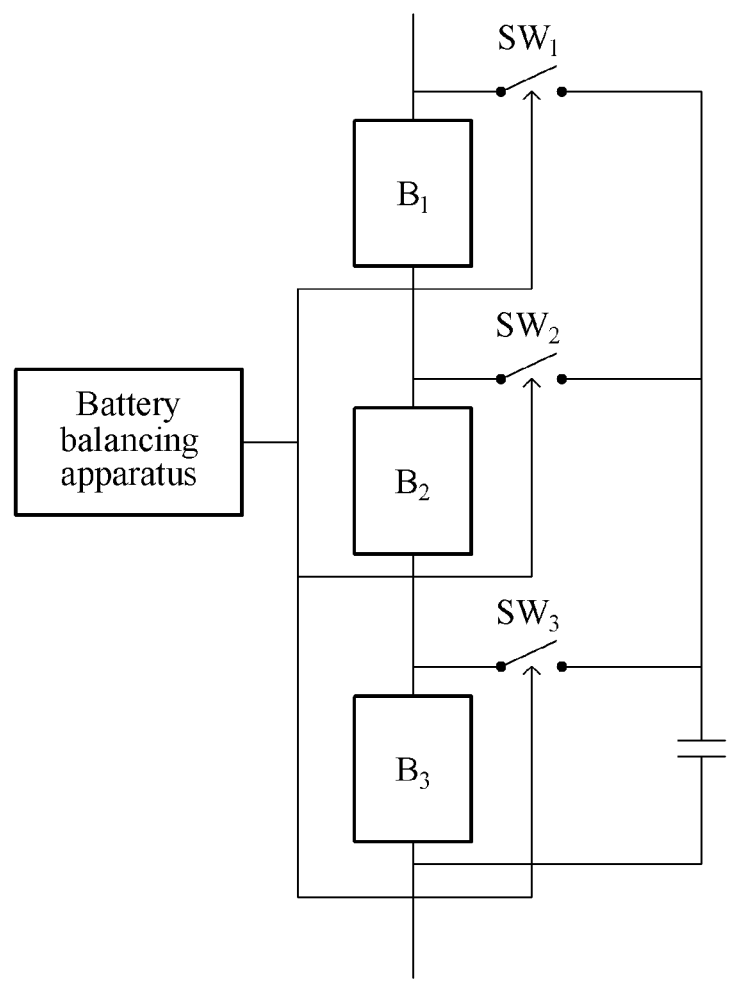
Figure 7:
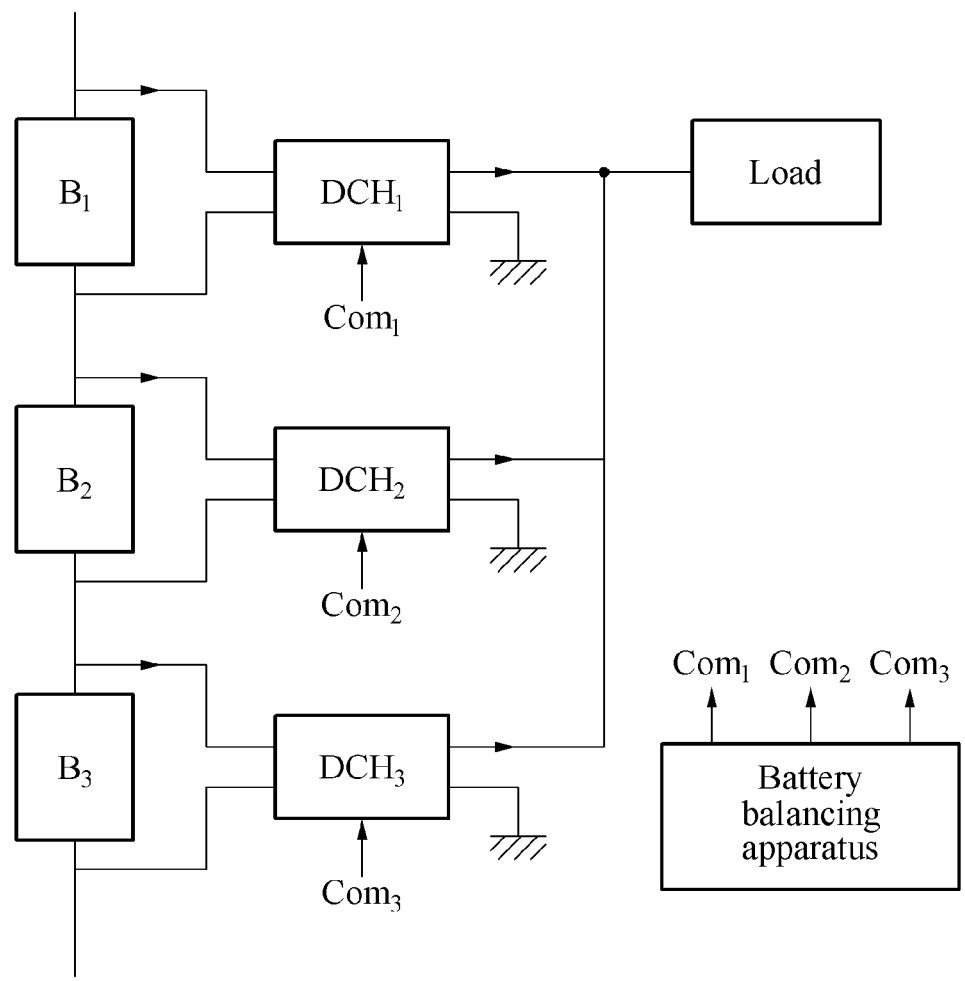

FIGS. 5 through 7 illustrate examples of balancing.

In the examples of FIGS. 5 through 7, battery unit $B_1$ has a lowest voltage or SOC and battery unit $B_3$ has a highest voltage or SOC. That is, it is assumed that state information of the battery unit $B_1$ is included in a first range, state information of a battery unit $B_2$ is in a second range, and state information of the battery unit $B_3$ is included in a third range. Depending on examples, each of the battery units $B_1$, $B_2$, and $B_3$ may represent a battery cell or a battery module.

Referring to FIG. 5, the battery balancing apparatus controls a passive balancing unit. In detail, the battery balancing apparatus may determine a balancing parameter that includes operational information and a balancing period, and may control the passive balancing unit based on the balancing parameter. The above description of FIGS. 1A through 4 are also applicable to an operation of the battery balancing apparatus, and are incorporated herein by reference. Thus, the above description may not be repeated here.

In an example, the battery balancing apparatus controls a passive balancing unit of the battery unit $B_1$ based on a balancing parameter that includes operational information indicating OFF. Accordingly, the passive balancing unit of the battery unit $B_1$ does not operate and power is not supplied to the passive balancing unit.

The battery balancing apparatus controls a passive balancing unit of the battery unit $B_2$ based on a balancing parameter that includes operational information indicating ON and a balancing period $T_B$. Accordingly, the battery balancing apparatus may control a switch $SW_2$ to electrically connect the battery unit $B_2$ and a resistance based on the balancing period $T_B$. Power of the battery unit $B_2$ may be consumed due to the resistance.

The battery balancing apparatus may control a passive balancing unit of the battery unit $B_3$ based on a balancing parameter that includes operational information indicating ON and a balancing period $T_B$. Accordingly, the battery balancing apparatus may control a switch $SW_3$ to electrically connect the battery unit $B_3$ and a resistance based on the balancing period $T_B$. Power of the battery unit $B_3$ may be consumed due to the resistance.

In an example, the power of each of the battery units $B_2$ and $B_3$ is consumed until voltage or state information of each of the battery units $B_2$ and $B_3$ becomes equal to voltage or state information of the battery unit $B_1$. If the voltage or state information of each of the battery units $B_2$ and $B_3$ is equal to the voltage or state information of the battery unit $B_1$, each of the switches $SW_2$ and $SW_3$ may be opened by the battery balancing apparatus. State information of each of the battery units $B_1$, $B_2$, and $B_3$ may become equivalent.

Referring to FIG. 6, the battery balancing apparatus controls an active balancing unit. The battery balancing apparatus may determine a balancing parameter that includes operational information and a balancing period, and may control a balancing unit based on the balancing parameter. The above description of FIGS. 1A through 4 are also applicable to an operation of the battery balancing apparatus, and are incorporated herein by reference. Thus, the above description may not be repeated here.

In an example, the battery balancing apparatus controls an active balancing unit of the battery unit $B_1$ based on a balancing parameter that includes operational information indicating OFF. Accordingly, the active balancing unit of the battery unit $B_1$ does not operate and power is not to be supplied to the active balancing unit.

In an example, the battery balancing apparatus controls an active balancing unit of the battery unit $B_2$ based on a balancing parameter that includes operational information indicating ON and a balancing period $T_B$. Accordingly, the battery balancing apparatus may control a switch $SW_2$ to electrically connect the battery unit $B_2$ and a capacitor based on the balancing period $T_B$. The battery unit $B_2$ charges the capacitor.

The battery balancing apparatus may control an active balancing unit of the battery unit $B_3$ based on a balancing parameter that includes operational information indicating ON and a balancing period $T_B$. Accordingly, the battery balancing apparatus may control a switch $SW_3$ to electrically connect the battery unit $B_3$ and a capacitor based on the balancing period $T_B$. The battery unit $B_3$ charges the capacitor.

In an example, once voltage or state information of each of the battery units $B_2$ and $B_3$ reaches a balancing state, each of the switches $SW_2$ and $SW_3$ are opened by the battery balancing apparatus. The battery balancing apparatus determines a balancing parameter that includes operational information indicating ON and controls the active balancing unit of the battery unit $B_1$ based on the balancing parameter. Accordingly, the battery unit $B_1$ is electrically connected to the capacitor through the switch $SW_1$ and is charged by the capacitor. The battery unit $B_1$ may be charged until the battery unit $B_1$ reaches a balancing state. Once the voltage or state information of the battery unit $B_1$ reaches the balancing state, the switch $SW_1$ may be opened. State information of each of the battery units $B_1$, $B_2$, and $B_3$ may become equivalent.

Referring to FIG. 7, a plurality of DCHs are electrically connected to a plurality of battery units, respectively. Each of the plurality of DCHs includes a direct current (DC)-to-DC converter to convert a high voltage power output from a corresponding battery unit to a low voltage power.

The battery balancing apparatus may determine a balancing parameter that includes operational information indicating OFF, and may control $DCH_1$ based on the balancing parameter. Accordingly, $DCH_1$ may not operate and power may not be output to $DCH_1$. The above description of FIGS. 1A through 4 are also applicable to an operation of the battery balancing apparatus, and are incorporated herein by reference. Thus, the above description may not be repeated here.

In an example, the battery balancing apparatus determines a balancing parameter that includes operational information indicating ON and a balancing period $T_B$. The battery balancing apparatus may define an output value $P_{DCH2}$ of $DCH_2$ based on deviation information associated with state information of the battery unit $B_2$. In an example, the battery balancing apparatus defines the output value $P_{DCH2}$ of $DCH_2$ based on a difference value $\Delta SOC$ between SOC of the battery unit $B_2$ and $SOC_{average}$. The battery balancing apparatus may control $DCH_2$ based on the balancing period and the output value, and $DCH_2$ may control the battery unit $B_2$. Accordingly, the battery unit $B_2$ may output an amount of power corresponding to the output value $P_{DCH2}$ to $DCH_2$. $DCH_2$ may step down a voltage of input power to a low voltage. The stepped down power may be supplied to a load.

In an example, the battery balancing apparatus determines a balancing parameter that includes operational information indicating ON and a balancing period $T_B$. In an example, the battery balancing apparatus defines an output value $P_{DCH3}$ of $DCH_3$ based on deviation information associated with state information of the battery unit $B_3$. Since state information of the battery unit $B_3$ is greater than state information of the battery unit $B_2$, the output value $P_{DCH3}$ may be defined to be greater than the output value $P_{DCH2}$. In one example, the battery balancing apparatus may apply a weight to an output value. Based on a type of the battery unit $B_3$, the battery balancing apparatus may apply w+α, w−α, or w×α to the output value $P_{DCH3}$. For example, the battery balancing apparatus may multiply or add the weight to the output value $P_{DCH3}$. In an example, the battery balancing apparatus controls DCH3 based on the balancing period and the output value, and $DCH_3$ controls the battery unit $B_3$. Accordingly, the battery unit $B_3$ outputs an amount of power corresponding to the output value $P_{DCH3}$ to $DCH_3$. $DCH_3$ may step down a voltage of input voltage to a low voltage. The stepped down power may be supplied to a load.

In the example of FIG. 7, the battery unit $B_1$ having the lowest SOC may not output the power and the battery units $B_2$ and $B_3$ having relatively high SOC may output the power. Here, the battery unit $B_3$ having the highest SOC may output a relatively large amount of power compared to the battery unit $B_2$. Accordingly, state information of each of the battery units $B_1$, $B_2$, and $B_3$ may become equivalent.

Figure 8:
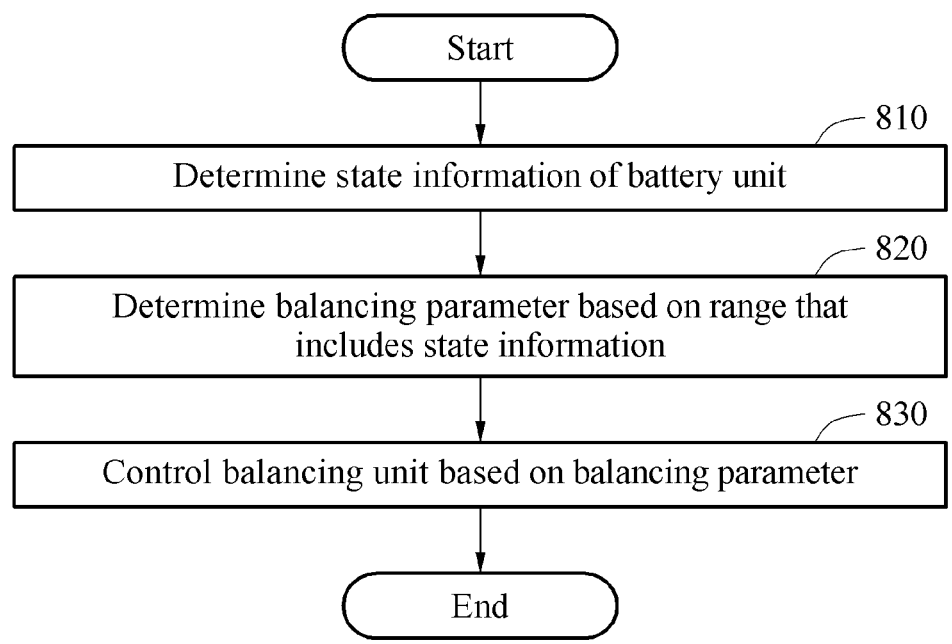
FIG. 8 is a diagram illustrating an example of a battery balancing method.

FIG. 8 is a diagram illustrating an example of a battery balancing method. The operations in FIG. 8 may be performed in the sequence and manner as shown, although the order of some operations may be changed or some of the operations omitted without departing from the spirit and scope of the illustrative examples described. Many of the operations shown in FIG. 8 may be performed in parallel or concurrently. One or more blocks of FIG. 8, and combinations of the blocks, can be implemented by special purpose hardware-based computer that perform the specified functions, or combinations of special purpose hardware and computer instructions. In addition to the description of FIG. 8 below, the above descriptions of FIGS. 1-7 is also applicable to FIG. 8, and are incorporated herein by reference. Thus, the above description may not be repeated here.

In an example, the battery balancing method of FIG. 8 is performed by a battery balancing apparatus.

Referring to FIG. 8, in 810, the battery balancing apparatus determines state information of a battery unit based on battery quantity data of the battery unit.

In 820, the battery balancing apparatus determines a balancing parameter associated with balancing of the battery unit based on a range that includes the state information. The balancing parameter includes at least one of operational information indicating an operation or a non-operation of the balancing unit and a balancing period.

In an example, the battery balancing apparatus defines operational information to turn OFF an operation of the balancing unit based on the range that includes the state information, or may determine the balancing period based on an update period of the state information.

In an example, the battery balancing apparatus determines the balancing period based on an update period of the state information, and defines an output value corresponding to a battery quantity data to be output while the battery unit performs balancing, based on deviation information associated with the state information. As described above with reference to FIG. 7, the battery balancing apparatus may define $P_{DCH}$.

In an example, the battery balancing apparatus determines whether to apply a weight to an output value based on deviation information associated with previous state information of the battery unit. For example, if the battery unit is determined as a normal type based on a distribution of deviation information associated with each of a plurality of pieces of previous state information of the battery unit, the battery balancing apparatus does not apply the weight to the output value. If the battery unit is determined as an abnormal type based on the distribution, the battery balancing apparatus may apply the weight to the output value. The abnormal type may include a first type corresponding to a case in which the deviation information is distributed in an area greater than a reference value, a second type corresponding to a case in which the deviation information is distributed in an area less than the reference value, and a third type corresponding to a case in which a difference value between adjacent deviation information is greater than a threshold. The first type may denote high of type 1, and the second type may denote low of type 1. The third type may denote type 2. An example of applying the weight to the output value is described above and the description are incorporated herein by reference. Thus, the above description may not be repeated here.

In operation 830, the battery balancing apparatus controls a balancing unit of the battery unit based on the balancing parameter.

The above descriptions with reference to FIGS. 1A through 7 may be applied to the example of FIG. 8 and are incorporated herein by reference. Thus, the above description may not be repeated here.

Figure 9:
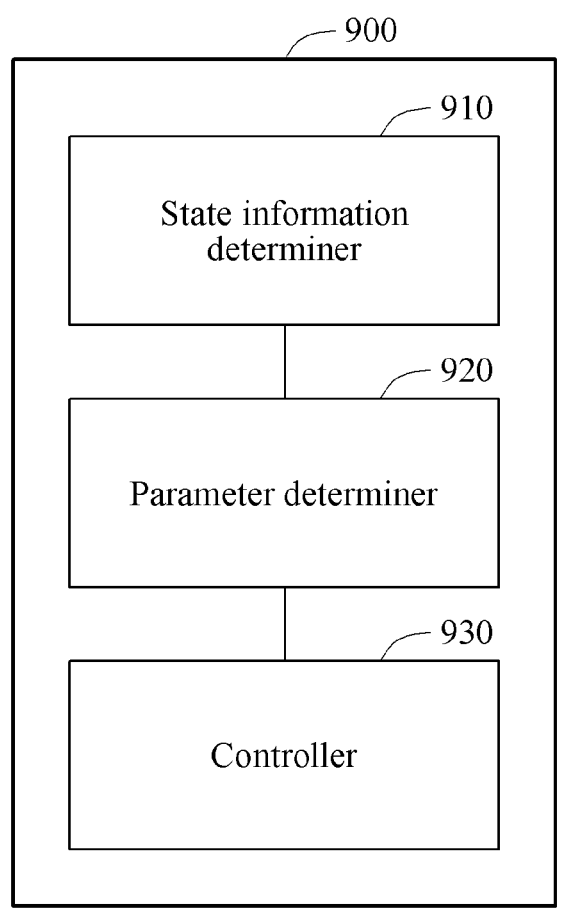
FIG. 9 is a diagram illustrating an example of a battery balancing apparatus.

FIG. 9 is a diagram illustrating an example of a battery balancing apparatus.

Referring to FIG. 9, a battery balancing apparatus 900 includes a state information determiner 910, a parameter determiner 920, and a controller 930.

The state information determiner 910 determines state information of a battery unit based on battery quantity data of the battery unit. The parameter determiner 920 determines a balancing parameter associated with balancing of the battery unit based on a range that includes the state information. The controller 930 controls a balancing unit of the battery unit based on the balancing parameter.

In an example, the state information determiner 910, the parameter determiner 920, and the controller 930 is implemented by a processor. Instructions executed by the processor are stored on a memory. For example, one or more instructions associated with the battery balancing method and/or weight control may be stored on the memory. In response to execution of the instructions by the processor, the processor determines state information of the battery unit based on battery quantity data of the battery unit, determines a balancing parameter associated with balancing of the battery unit based on a range that includes the state information, and controls the balancing unit of the battery unit based on the balancing parameter.

The processor may perform the aforementioned battery balancing method and/or weight control and the above description are incorporated herein by reference. Thus, the above description may not be repeated here The above descriptions with reference to FIGS. 1A through 8 may be applied to the example of FIG. 9 and are incorporated herein by reference. Thus, the above description may not be repeated here.

Figure 10:
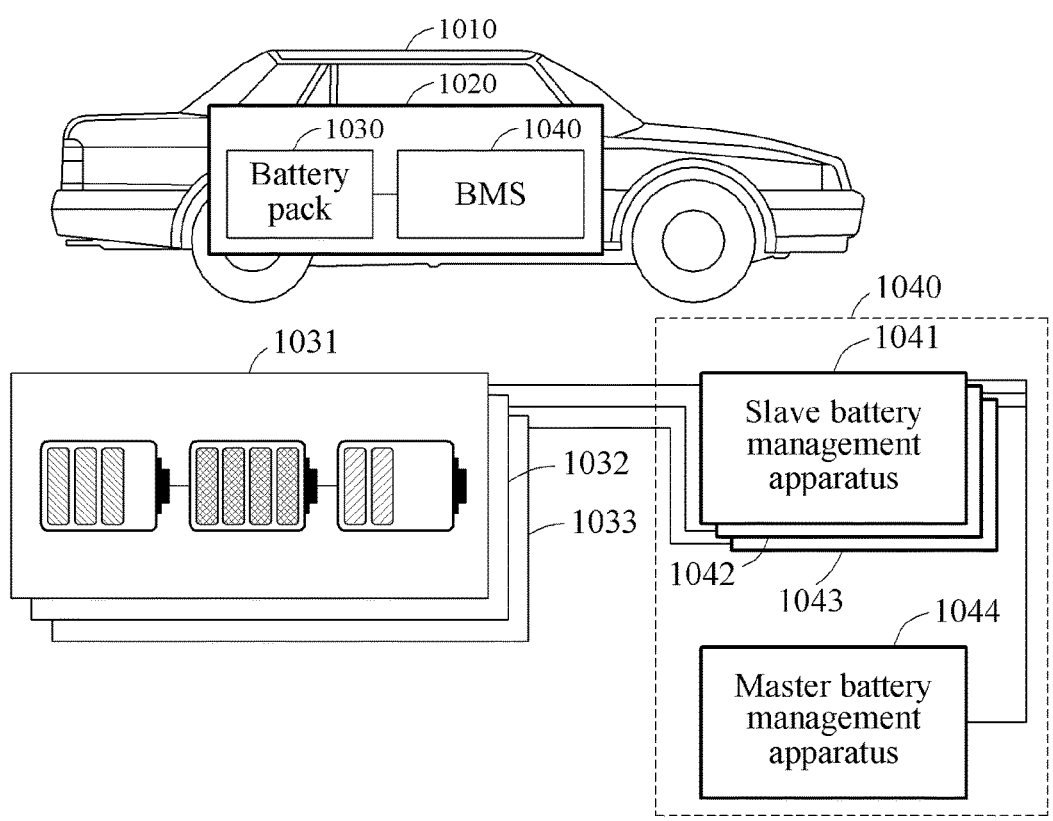
FIG. 10 is a diagram illustrating an example of a battery system.

FIG. 10 is a diagram illustrating an example of a battery system.

FIG. 10 illustrates a vehicle 1010. The vehicle 1010 may be, for example, an electric vehicle or a hybrid vehicle.

Referring to FIG. 10, a battery apparatus 1020 includes a battery pack 1030 and a battery management system (BMS) 1040.

In an example, the battery pack 1030 includes a plurality of battery modules 1031, 1032, and 1033. Each of the plurality of battery modules 1031, 1032, and 1033 includes a plurality of battery cells.

The BMS 1040 includes a master battery management apparatus 1044 and a plurality of slave battery management apparatuses 1041, 1042, and 1043.

In an example, each of the slave battery management apparatuses 1041, 1042, and 1042 includes the aforementioned battery balancing apparatus (not shown). A processor, such as, for example, a micro processing unit (MCU) included in each of the plurality of slave battery management apparatuses 1041, 1042, and 1043 performs the aforementioned battery balancing method. An example in which each of the plurality of slave battery management apparatuses 1041, 1042, and 1043 performs the battery balancing method will be described.

The slave battery management apparatus 1041 collects battery quantity data of each of the plurality of battery cells included in the battery module 1031. The slave battery management apparatus 1041 determines state information of each of the plurality of battery cells based on the battery quantity data of each of the plurality of battery cells. The slave battery management apparatus 1041 determines a range that includes state information of each of the plurality of battery cells. As described above, the slave battery management apparatus 1041 determines whether the state information of each of the plurality of battery cells are included in a first range, a second range, or a third range. In one example, at least one value of $R_{ML}$, $R_{SL}$, $R_{SH}$, and $R_{MH}$ may vary based on an operational mode of the vehicle 1010. For example, if the operational mode of the vehicle 1010 is a sports mode, the second range and/or the third range may become wide. Also, a value of M and/or N that is a factor used to determine a balancing period may decrease. Accordingly, the balancing period may be further reduced before the operational mode is changed.

The slave battery management apparatus 1041 may determine a balancing parameter associated with balancing of each of the plurality of battery cells. The slave battery management apparatus 1041 may control a balancing unit of each of the plurality of battery cells based on the balancing parameter, i.e., the slave battery management apparatus 1041 may operate so that passive balancing, active balancing, or balancing using a DCH may be performed on each of the plurality of battery cells.

Passive balancing is described with reference to FIG. 5, active balancing is described with reference to FIG. 6, and balancing using a DCH is described with reference to FIG. 7. Description related to each type of balancing is given above, and is incorporated herein by reference. State information of each of the plurality of battery cells within the battery module 1031 may become equivalent through balancing. Likewise, other slave battery management apparatuses 1042 and 1043 may operate to be similar to the slave battery management apparatus 1041.

Depending on examples, the master battery management apparatus 1044 may include the battery balancing apparatus. That is, the processor, for example, the MCU, included in the battery management apparatus 1044 may perform the aforementioned battery balancing method.

The BMS 1040 may be installed on a large capacity BMS, such as an energy storage system (ESS). Also, the BMS 1040 may be installed on an electronic device or a device management system in which a rechargeable battery is provided.

The above description with reference to FIGS. 1A through 9 may be applied to the example of FIG. 10 and are incorporated herein by reference. Thus, the above description may not be repeated here.

The battery balancing apparatus, battery balancing apparatus 900, state information determiner 910, parameter determiner 920, controller 930, battery management system (BMS) 1040, master battery management apparatus 1044, slave battery management apparatuses 1041, 1042, and 1043, and other apparatuses, units, modules, devices, and other components are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1A, 2, 4, and 8 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control a processor or computer to implement the hardware components and perform the methods as described above, and any associated data, data files, and data structures, are recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, a card type memory such as multimedia card micro or a card (for example, secure digital (SD) or extreme digital (XD)), magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A battery balancing method, comprising:
   determining state information of a battery unit based on battery quantity data of the battery unit;
   determining a balancing parameter of the battery unit based on one or more ranges comprising the state information; and
   controlling a balancing unit based on the balancing parameter,
   wherein the balancing parameter comprises operational information indicating an operational state of the balancing unit and a balancing period, and
   wherein the determining of the balancing parameter comprises, in response to determining that the state information is outside of a first range among the one or more ranges, determining a period value corresponding to the outside as the balancing period, and
   wherein the determined period value is different from a period value corresponding to inside of the first range.

2. The battery balancing method of claim 1, wherein the determining of the balancing parameter further comprises defining the operational state of the balancing unit to be OFF.

3. The battery balancing method of claim 1, wherein the determining of the balancing parameter further comprises:
   determining the balancing period based on an update period of the state information.

4. The battery balancing method of claim 1, wherein the determining of the balancing parameter further comprises:
   determining the balancing period based on an update period of the state information;
   defining an output value corresponding to a battery quantity based on deviation information associated with the state information, in response to balancing being performed; and
   determining whether to apply a weight to the output value based on deviation information associated with a previous state information of the battery unit.

5. The battery balancing method of claim 4, wherein the determining of whether to apply the weight comprises:
   not applying the weight to the output value, in response to the battery unit being determined as a normal type based on a distribution of deviation information associated with each of a plurality of previous state information of the battery unit, and
   applying the weight to the output value, in response to the battery unit being determined as an abnormal type based on the distribution of the deviation information.

6. The battery balancing method of claim 5, wherein the abnormal type comprises:
   a first type corresponding to the deviation information being distributed in an area greater than a reference value,
   a second type corresponding to the deviation information being distributed in an area less than the reference value,
   a third type corresponding to a difference value between adjacent deviation information being greater than a threshold, and
   the applying of the weight comprises defining a value less than a reference value as the weight in response to the battery unit being determined as the first type or the third type, and defining a value greater than the reference value as the weight in response to the battery unit being determined as the second type.

7. The battery balancing method of claim 1, wherein the determining of the balancing parameter further comprises:
   determining the operational information to turn the balancing unit OFF, in response to the state information being included in the first range,
   determining a period value corresponding to a second range among the one or more ranges as the balancing period in response to the state information being included in the second range,
   determining a period value corresponding to a third range among the one or more ranges as the balancing period in response to the state information being included in the third range, and
   determining the period value corresponding to the third range being lesser than the period value corresponding to the second range.

8. The battery balancing method of claim 7, wherein:
   the period value corresponding to the second range comprises a product of an integer and an update period of the state information, and the period value corresponding to the third range comprises a product of another integer less than the integer and the update period.

9. The battery balancing method of claim 1, wherein the determining of the balancing parameter further comprises:
the operational information being configured to turn the balancing unit OFF, in response to the state information being included in the first range,
defining an output value corresponding to a battery quantity to be output while the battery unit performs balancing in response to the state information being included in a second range,
outputting the output value in response to the state information being included in a third range among the one or more ranges, and
applying a weight to the output value.

10. The battery balancing method of claim 9, wherein the applying of the weight comprises:
defining a value less than a threshold as the weight in response to deviation information associated with each of a plurality of previous state information of the battery unit being distributed in an area greater than a reference value,
defining a value greater than the threshold as the weight in response to the deviation information being distributed in an area less than the reference value, and
defining a value less than the threshold as the weight in response to a difference value between adjacent deviation information being greater than a reference.

11. A battery balancing apparatus, comprising:
a processor configured to determine state information of a battery unit based on battery quantity data of the battery unit, to determine a balancing parameter of the battery unit based on one or more ranges that include the state information, and to control a balancing unit based on the balancing parameter,
wherein the balancing parameter comprises operational information indicating an operational state of the balancing unit and a balancing period, and wherein the processor is further configured to determine a period value corresponding to outside of a first range among the one or more ranges as the balancing period, in response to determining that the state information is included in the outside, and
wherein the determined period value is different from a period value corresponding to inside of the first range.

12. The battery balancing apparatus of claim 11, wherein the processor is further configured to define the operational state of the balancing unit being OFF.

13. The battery balancing apparatus of claim 11, wherein the processor is further configured to determine the balancing period based on an update period of the state information.

14. The battery balancing apparatus of claim 11, wherein the processor is further configured to determine the balancing period based on an update period of the state information, to define an output value corresponding to a battery quantity based on deviation information associated with the state information, in response to balancing being performed, and to determine whether to apply a weight to the output value based on deviation information associated with a previous state information of the battery unit.

15. The battery balancing apparatus of claim 14, wherein the processor is further configured to not apply the weight to the output value in response to the battery unit being determined as a normal type based on a distribution of deviation information associated with each of a plurality of previous state information of the battery unit, and to apply the weight to the output value in response to the battery unit being determined as an abnormal type based on the distribution of the deviation information.

16. The battery balancing apparatus of claim 15, wherein the abnormal type comprises:
a first type corresponding to the deviation information being distributed in an area greater than a reference value,
a second type corresponding to the deviation information being distributed in an area less than the reference value,
a third type corresponding to a difference value between adjacent deviation information being greater than a predetermined reference, and
the processor is further configured to define a value less than a reference value as the weight in response to the battery unit being determined as the first type or the third type, and to define a value greater than the reference value as the weight in response to the battery unit being determined as the second type.

17. The battery balancing apparatus of claim 11, wherein the processor is further configured to
define the operational information to turn the balancing unit OFF, in response to the state information being included in the first range,
to determine a period value corresponding to a second range among the one or more ranges as the balancing period in response to the state information being included in the second range,
to determine a period value corresponding to a third range among the one or more ranges as the balancing period in response to the state information being included in the third range, and
the period value corresponding to the third range being lesser than the period value corresponding to the second range.

18. The battery balancing apparatus of claim 17, wherein the period value corresponding to the second range comprises a product of an integer and an update period of the state information, and
the period value corresponding to the third range comprises a product of another integer less than the integer and the update period.

19. The battery balancing apparatus of claim 11, wherein the processor is further configured to define the operational information to turn the balancing unit OFF, in response to the state information being included in the first range, to define an output value corresponding to a battery quantity to be output while the battery unit performs balancing in response to the state information being included in a second range among the one or more ranges, to output the output value in response to the state information being included in a third range among the one or more ranges, and to apply a weight to the output value.

20. The battery balancing apparatus of claim 19, wherein the processor is further configured to define a value less than a threshold as the weight in response to deviation information associated with each of a plurality of previous state information of the battery unit being distributed in an area greater than a reference value, to define a value greater than the threshold as the weight in response to the deviation information being distributed in an area less than the reference value, and to define a value less than the threshold as the weight in response to a difference value between adjacent deviation information being greater than a reference.

* * * * *